United States Patent [19]

Pak et al.

[11] Patent Number: 5,716,671
[45] Date of Patent: Feb. 10, 1998

[54] CONTINUOUS DEPOSITION OF BRIDGE FREE INTERFACIAL COATINGS ON MULTIFILAMENTARY CERAMIC FIBER TOWS

[75] Inventors: Sung S. Pak, Chula Vista, Calif.; Richard W. Goettler, Lynchburg; Archie N. Tolley, Appomattox, both of Va.

[73] Assignee: The Babcock & Wilcox Company, New Orleans, La.

[21] Appl. No.: 252,809

[22] Filed: Jun. 2, 1994

[51] Int. Cl.$^6$ .................................................. B05D 7/00
[52] U.S. Cl. .................. 427/214; 427/220; 427/376.2; 427/419.2; 427/419.8; 427/430.1; 427/443.2
[58] Field of Search ..................... 427/443.2, 214, 427/220, 276.2, 419.2, 419.8, 430.1; 501/95

[56] References Cited

U.S. PATENT DOCUMENTS

| | | | |
|---|---|---|---|
| 4,738,896 | 4/1988 | Stevens | 428/315.9 |
| 5,024,859 | 6/1991 | Millard et al. | 427/443.2 |
| 5,227,199 | 7/1993 | Hazleback et al. | 427/443.2 |

OTHER PUBLICATIONS

Garino, T., "Heterocoagulation as an Inclusion Coating Technique for Ceramic Composite Processing," J. Am. Cer. Soc., 75[3] pp. 514–518 (1992).

Fischer, H.E., et al., "Fiber Coatings Derived from Molecular Precursors," MRS Bol. pp. 59, 60, 61, 62, 63, 64, 65. (1991).

Malghan, S.G., et al., "Coating of Fibers by Colloidal Techniques in Ceramic Composites," Cer. Engr. Sci. Proc. 11[9–10] pp. 1674–1684 (1990).

Hay, R.S., "Sol–Gel Coating of Fiber Tows," Cer. Engr. Sci. Proc., 12[7–8] pp. 1064–1074 (1991).

Cranmmer, D. C., "Fiber Coating and Characterization," Ceramic Bulletin, pp. 415–419, 1989.

*Primary Examiner*—Benjamin Utech
*Attorney, Agent, or Firm*—Daniel S. Kalka; Robert J. Edwards

[57] ABSTRACT

A method for coating ceramic fibers such as $Al_2O_3$ fibers includes immersing the $Al_2O_3$ fibers in a polyelectrolyte solution. After the polyelectrolyte is allowed to adsorb on the fibers, the unabsorbed polyelectrolyte is washed from the fibers with a distilled water. The fibers are then deposited in an oxide solution such as $SnO_2$. The $SnO_2$ is allowed to adsorb on the fibers, and then the unabsorbed $SnO_2$ is washed from the fibers with the distilled water. The fibers are then sintered at a temperature ranging from 400° C. to 1200° C.

10 Claims, 9 Drawing Sheets

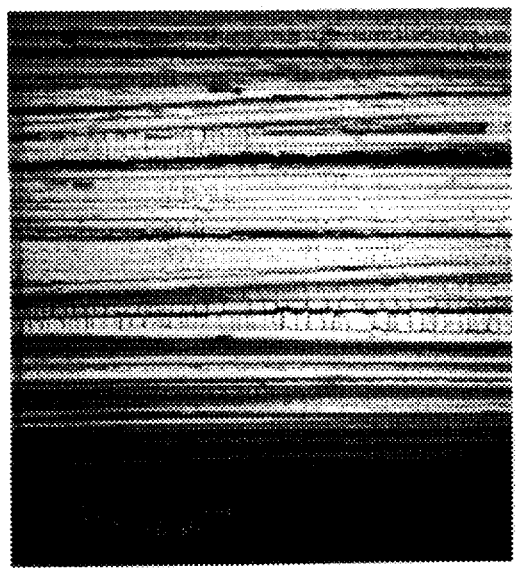
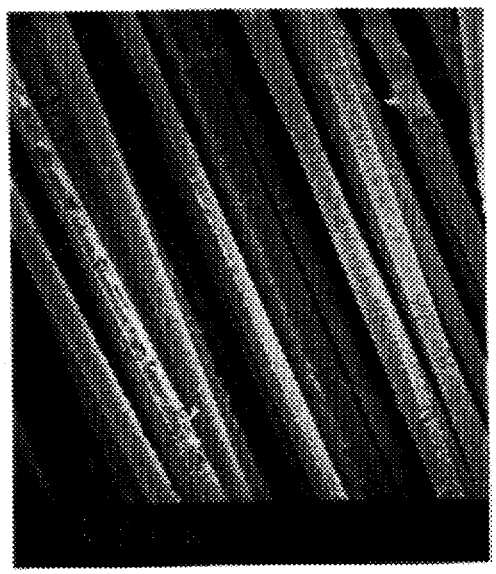
FIG. 2A
FIG. 2B

# CONTINUOUS DEPOSITION OF BRIDGE FREE INTERFACIAL COATINGS ON MULTIFILAMENTARY CERAMIC FIBER TOWS

BACKGROUND OF THE INVENTION

1. Field of the Invention

The present invention relates, in general, to ceramics and, in particular, to a new and useful method for coating multifilamentary ceramic fibers with adherent oxides which are bridge-free.

2. Description of the Related Art

Generally, the unique combination of high melting temperature, strength, and corrosion resistance allows for ceramics to be ideal for high temperature structural applications. Despite the potential, ceramic use has been primarily confined to static loading conditions, such as furnace linings, due to its propensity for catastrophic failure. It has been demonstrated, however, that toughness can be induced in ceramics by reinforcement with high strength, high modulus fibers. Pioneering work in this area subsequently led to the fundamental understanding of toughening mechanisms and the successful demonstration of damage tolerance in more dynamic environments.

It is critical to the inducement of toughness in composites to create weak fiber/matrix interfaces for debonding and sliding of fibers during fracture. The most practical method to create weak interfaces is by depositing suitable coatings around individual fibers. It is known that these coatings should be relatively continuous, free of bridging, and nonreactive with either the matrix or the fiber.

Numerous coating techniques have been tested and assessed, but chemical vapor deposition (CVD) and sol-gel methods have emerged as the most promising for creating weak interfaces. Sol-gel methods are especially attractive because of their potential cost benefits. Furthermore, many multicationic, stoichiometric oxide coatings can be deposited by no other practical way but by sol-gel processes. However, for those coating systems which can be deposited by either technique, the morphology of sol-gel derived coatings are generally inferior to that obtained by CVD. This exists due to the improper choice of precursors and the absence of driving force for adsorption.

In most sol-gel processes, coatings are deposited by dipping desized fibers in polymer or salt solutions followed by drying and calcining. While the fibers are immersed in the solution, little or no deposition occurs because there is virtually no driving force for adsorption. Only upon drying of the solvent, and subsequently when the solubility of the precursor is exceeded, the precursor precipitates on the surface of the fiber. This invariably leads to bridging of the fibers by the coatings because the last place to be dried is usually the area between the fibers.

Traditional methods of dealing with this problem usually involve dilution of the solution. The degree of bridging can be controlled to an extent, but can never be totally eliminated by this method. Furthermore, the dilution results in very thin coatings, and hence usually requires multiple dipping, drying and calcining cycles. Typically, five to eight cycles are required to build up a coating thickness of 0.2 μm. Not surprisingly, with each processing cycle, fiber strength and surface morphology become progressively worse.

A technique that was studied under laboratory conditions for fiber coating is based on coagulation between dissimilar materials, i.e. heterocoagulation. Heterocoagulation is a relatively old and known concept, but only recently, efforts have been made in this area to coat fibers. The technique involves precoating the substrate material with a polyelectrolyte to induce a favorable charge relationship between the substrate and the coating particles. Although some promising results were obtained with short monofilaments and particles, the previous work failed to demonstrate the ability to coat the more commercially-important multifilamentary, continuous tows. Consequently, the critical issue of eliminating bridging, an unavoidable issue associated with multifilamentary tows, was not addressed. Furthermore, the previous investigation made use of relatively coarse particles (approximately 0.45 μm in diameter) as precursors for coatings. The coarse particles require high processing temperatures and inevitably lead to rough coating surfaces.

Presently, there is no known method for coating multifilamentary ceramic fiber tows with a sufficiently thick coating and which eliminates bridging between the fibers in only one cycle of dipping, drying and calcining.

SUMMARY OF THE INVENTION

The present invention pertains to the coating by deposition of multifilamentary ceramic tows for providing adherent coatings which are free of bridging using only one cycle of dipping, drying and calcining.

The present invention provides for coating $Al_2O_3$ fibers comprising immersing the $Al_2O_3$ fibers in a polyelectrolyte solution and allowing the polyelectrolyte to adsorb on the fibers. Other fibers and coating compositions can be employed by the technology described by this patent application. Suitable fibers include those exhibiting zeta potential such as oxynitrides, carbides, nitrides, etc. The unabsorbed polyelectrolyte is then washed from the fibers by dripping distilled water having a pH ranging from 5 to 7. The fibers are then deposited in an oxide solution such as $SnO_2$ or an amine stabilized $TiO_2$ solution. After the oxide particles of the solution adsorb onto the fibers, the unabsorbed oxides are washed from the fibers with distilled water. The fibers are then sintered at a temperature ranging from 400° C. to 1200° C. The pH of the wash solution is critical so as not to change the zeta potential of the fibers and coating particles in a manner which would change the attractive nature between the two.

The polyelectrolyte solution has a pH ranging from 8 to 12 and can comprise polyethylenimine or polymethyl methacrylate. When polymethyl methacrylate is used as the polyelectrolyte solution, the $Al_2O_3$ fibers are immersed in a $ZrO_2$ nitrate stabilized solution.

The present invention also provides for coating the $Al_2O_3$ fibers with a $Y_3Al_5O_{12}$ sol used in conjunction with a polymethyl methacrylate solution.

It is an object of the present invention to provide a method for depositing coatings on ceramic fibers which are bridge-free.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 2a is a photocopy of a photograph illustrating the fibers prior to washing;

FIG. 2b is a photocopy of a photograph illustrating the fibers after washing has been performed;

FIG. 4b is a photocopy of a photograph of an X-ray map of FIG. 4a;

FIG. 4c is a photocopy of a photograph illustrating a fiber of FIG. 4a;

FIG. 6b is a photocopy of a photograph of an X-ray map of FIG. 6a;

FIG. 6c is a photocopy of a photograph of a fiber of FIG. 6a;

FIG. 7b is a photocopy of a photograph of an X-ray map of FIG. 7a;

FIG. 7c is a photocopy of a photograph of a fiber of FIG. 7a;

FIG. 9b is a photocopy of a photograph of an X-ray map of FIG. 9a; and

FIG. 9c is a photocopy of a photograph of a fiber of FIG. 9a.

DESCRIPTION OF THE PREFERRED EMBODIMENTS

The process, according to the present invention, allows for the continuous deposition of adherent oxide coatings that are virtually free of bridging in only one cycle of dipping, drying and calcination. The present invention ensures that a high coating efficiency and quality (bridge-free) is achieved by 1) inducing a large driving force for deposition, 2) utilizing fine particles as coating precursors, 3) confining the deposition process to occur while the precursors are still dispersed in water, and 4) washing away any excess precursor. The driving force for adsorption is provided by inducing net opposite surface charges. Inducing net opposite charges often involves adsorbing suitable polyelectrolytes on fibers prior to coating and controlling the pH of the solution during coating.

Figure 1:
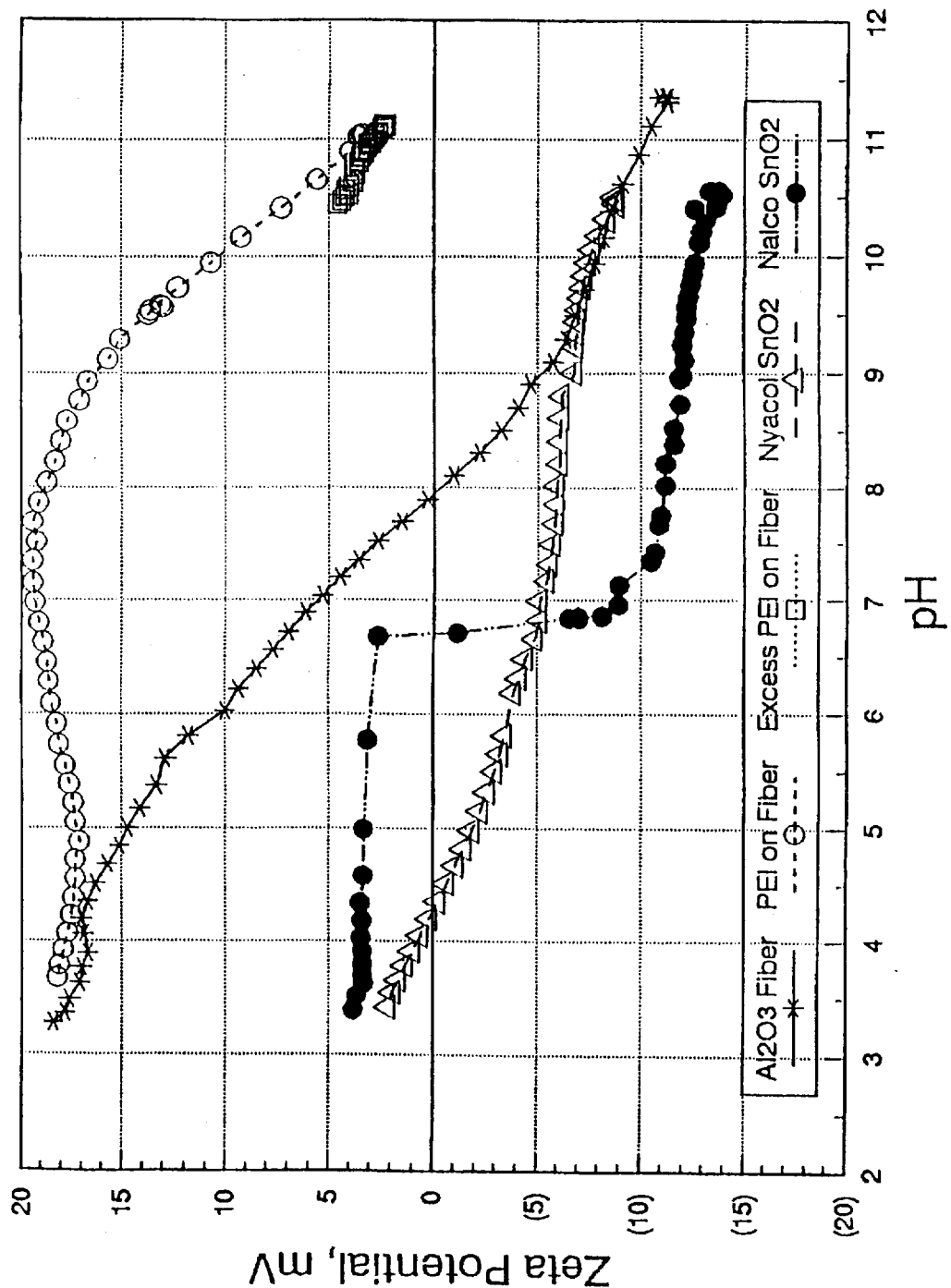
FIG. 1 is a graph plotting zeta potential vs. pH for various oxides used in conjunction with the present invention.

The present invention is described for the process of depositing $SnO_2$ coating on $Al_2O_3$ fibers. FIG. 1 illustrates zeta potential curves of various oxides used in the process. Zeta potential is a measure of surface electric potential which usually varies as a function of pH. As shown in FIG. 1, $Al_2O_3$ fibers are positively charged at pH below 8 and negatively charged at pH above 8. At pH of 8, its net surface charge is zero. This point is often referred to as its isoelectric point (i.e.p.). The magnitude of the charge potential increases in either direction away from the isoelectric point. Also shown are the zeta potential curves of two commercially available $SnO_2$ sols: SN15CG which is 15 nm in diameter and is sold by Nyacol of Ashland, Mass. and SN-123 which is less than 10 nm in diameter and is sold by Nalco Chemical Co. of Naperville, Ill. The i.e.p's are pH of 4 for Nyacol $SnO_2$ and pH of 6.7 for Nalco $SnO_2$.

In order for the coagulation between $SnO_2$ and $Al_2O_3$ fibers to occur, not only their relative surface charges have to be opposite in sign, but their total potential difference has to be large as well. From the zeta potential analysis, illustrated in FIG. 1 for unmodified $Al_2O_3$ fibers and $SnO_2$ sols, it is clear that these two conditions are not yet satisfied. However, the charge relationship can be adjusted by adsorbing charge inducing polymers, i.e. polyelectrolyte on the surfaces of the alumina fibers. A favorable surface charge relationship can also be achieved by coating the coating particles with an appropriate polyelectrolyte. Polyethylenimine (PEI) is suitable for this purpose. As shown by the open circles ("O") in FIG. 1, PEI causes the alumina fiber to be highly positively charged at all pH levels. The magnitude of the potential difference between commercial $SnO_2$ sols and polyelectrolyte adsorbed $Al_2O_3$ are large enough for heterocoagulation to occur at a pH greater than 4.7 for Nalco $SnO_2$ and 6.7 for Nyacol $SnO_2$.

In order to manufacture these coatings, the entire process is automated for continuous processing. In this automated process, a spool of commercially available $Al_2O_3$ fibers, such as the fibers sold under the trademark Almax by the Mitsui Mining Co. of Japan is mounted on one end of a coater device and desized by pulling it through a tube furnace whose temperature is maintained at 700° C. The fiber tow is then dipped in an aqueous solution of 1% to 25% polyethylenimine by weight, preferably 5% polyethylenimine by weight, in order to allow the polyelectrolyte to adsorb on the fiber surfaces. Unabsorbed polymers are washed away by dripping distilled water whose pH is between 5 and 7. A minimum of 20 drops are needed for each inch of moving tow. This washing step is critical for minimizing bridging among fibers.

The tow is then redipped in a 5% to 50% $SnO_2$ solution by weight, preferably 20% $SnO_2$ sol, such as SN-123, having a pH of 10. Again, excess $SnO_2$ is washed away by dripping distilled water. As shown in FIGS. 2a and 2b, a significant amount of bridging occurs without the washing step. The tow is then sintered at a temperature ranging from 400° C. to 1200° C., and finally wound onto a spool. The ultrafine particle size of the coatings requires only a moderate temperature for densification.

Figure 3:
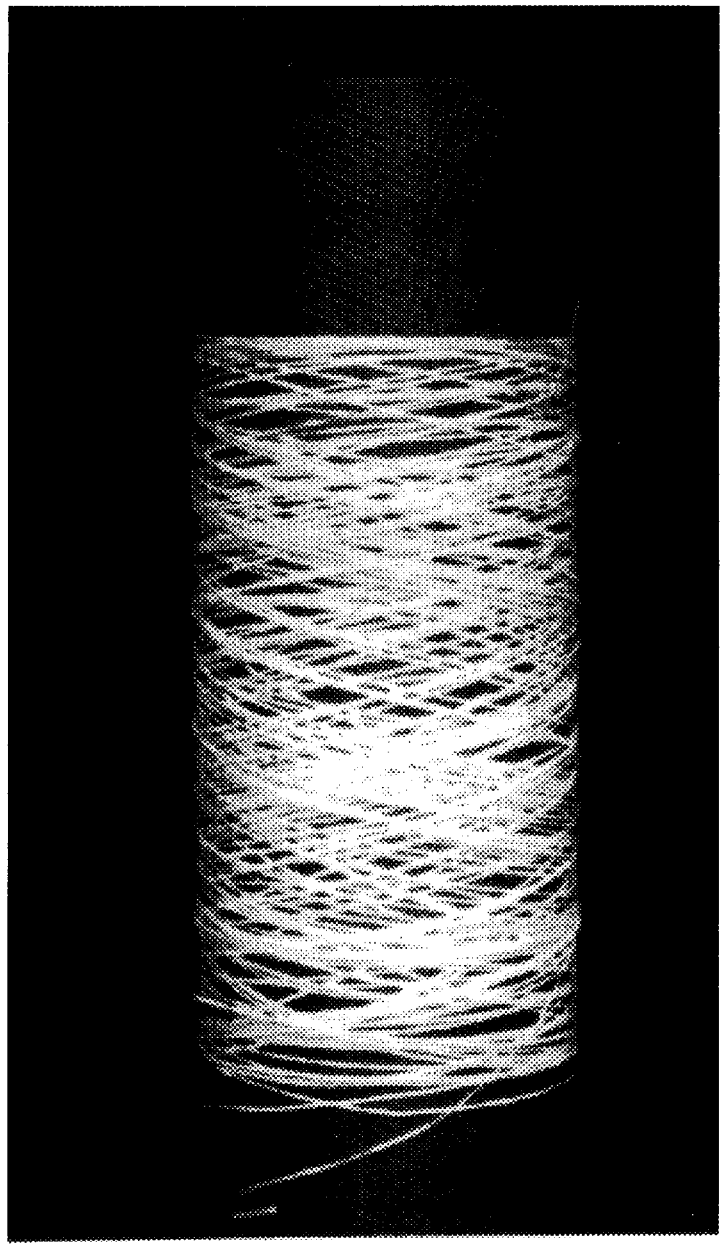
FIG. 3 is a photocopy of a photograph illustrating a spool of coated $Al_2O_3$ fiber coated in accordance with the present invention.

FIG. 3 shows a spool of 300 ft. Almax, a registered trademark of Mitsui Mining Co., fibers coated with $SnO_2$ by this process. A maximum coating rate of 36 inches/min has been achieved by the present invention. Higher coating rates can be easily achieved by lengthening the furnaces.

Figure 4A:
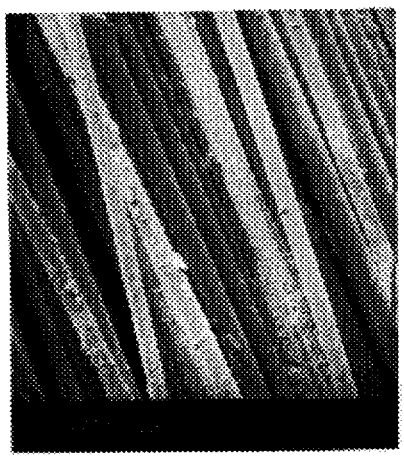
FIG. 4a is a photocopy of a photograph of a 0.2 μm thick $SnO_2$ coating on $Al_2O_3$ fibers.
Figure 4B:
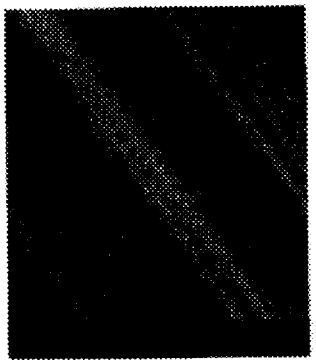
Figure 4C:
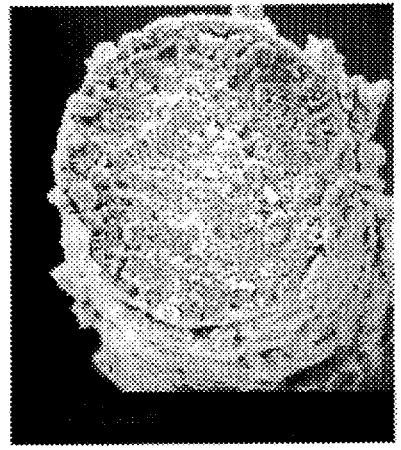

FIGS. 4a, 4b and 4c illustrate coated tow created by depositing 0.2 μm thickness of $SnO_2$ on $Al_2O_3$ fibers. FIG. 4a shows that the fibers are uniformly coated and are free of bridging. FIG. 4b is an X-ray map of FIG. 4a. The white dots indicate ample presence of Sn. The thickness of the coating is approximately 0.2 μm as shown in FIG. 4c.

Unlike conventional sol-gel coating processes, the present invention provides sufficiently thick coatings that are virtually free of bridging and can be obtained in only one dip/drying/calcination cycle. The excellent coating efficiency and quality are accomplished by the following two key features of the present invention: 1) the magnitude of driving force for adsorption and thus the coating thickness can be controlled easily by controlling the pH of the solution and the type of adsorbed polyelectrolyte and 2) the deposition occurs in the solution and any unabsorbed particles are washed away.

No spreading of the tow is needed because the deposition occurs while the fibers are immersed in the solution. When the fibers are immersed, they spread out automatically, much like the bristles of a paint brush spread in water, due to the wetting of fibers by water. Therefore, no physical spreading of the tows is necessary with this process.

Unlike the known coating methods, the coatings produced by the present invention are smooth because only nanometer-sized particles instead of particles in the micrometer range are used by the present invention. The finer particles have an added advantage in that only moderately high temperatures are required by sintering. For example, 700° C. is sufficient for most coatings of interest.

Table I shows the results of comparison testing of the coating process according to the present invention which indicates it is less damaging to the fibers than conventional chemical vapor deposition (CVD). It is shown that as-received fibers with protective PVA sizing had a tensile strength of 9.78 lb. The fibers coated by the present method, on the other hand, had a tensile strength of 10.43 lb. CVD coated fibers had a slightly higher strength due to a slightly higher coating thickness. The advantage of the present invention becomes clearly evident, however, when the fiber tows are exposed to high temperatures. The strength of CVD coated tows decrease sharply due to the presence of residual chlorides. The residual chlorides react with the substrate fibers at elevated temperatures and thereby degrade the strength. The strengths of the tows coated by the present invention also decrease, but over 76% of their room temperature strength is retained, compared to only 29% for the CVD coated fibers. This illustrates the nonaggressive nature of the coating precursors used in the present invention.

TABLE I

Mechanical properties of $SnO_2$ coated Almax $Al_2O_3$ fibers.

| | Maximum load before failure | |
|---|---|---|
| As-received, w/PVA sizing | 9.78 lb. | |
| Coating Method | CVD | Sol-gel |
| As-deposited | 11.90 lb. | 10.43 lb. |
| After 4 hr exposure @ 1100° C. | 3.4 lb. | 7.95 lb. |

1000 filaments/tow, gauge length = 3 in., 6 samples/test

Figure 5A:
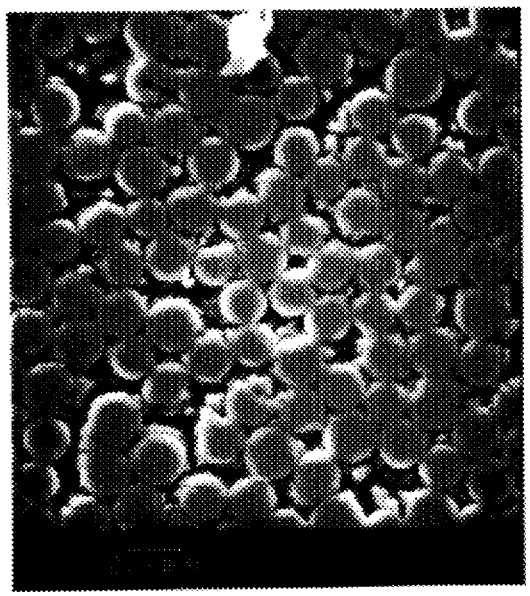
FIG. 5a is a photocopy of a photograph illustrating $Al_2O_3$ fibers without $SnO_2$ coating.
Figure 5B:
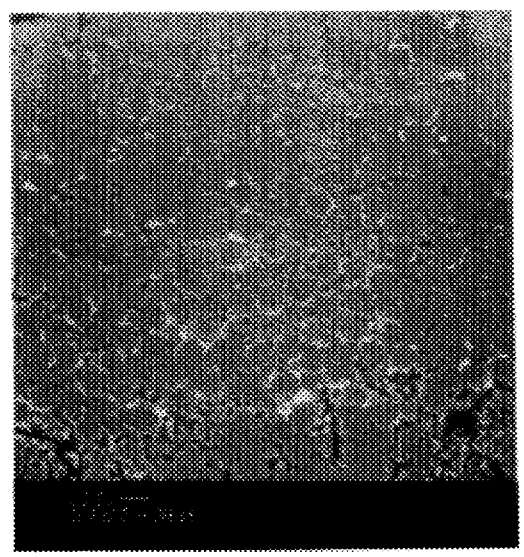
FIG. 5b is a photocopy of a photograph illustrating the fibers of FIG. 5a with $SnO_2$ coating.

FIG. 5a illustrates $Al_2O_3$ fibers without $SnO_2$ coating. FIG. 5b shows a cross section of an $Al_2O_3/SnO_2/Al_2O_3$ composite tube fabricated by filament winding $SnO_2$ coated $Al_2O_3$ fibers and by subsequently impregnating the preform with $Al_2O_3$. FIG. 5b shows that the coating (circumferential white layers around each fiber) has not been damaged by the impregnation and heat treatment. It also reveals the coating also effectively prevented the matrix $Al_2O_3$ from reacting with the fibers.

Figure 6A:
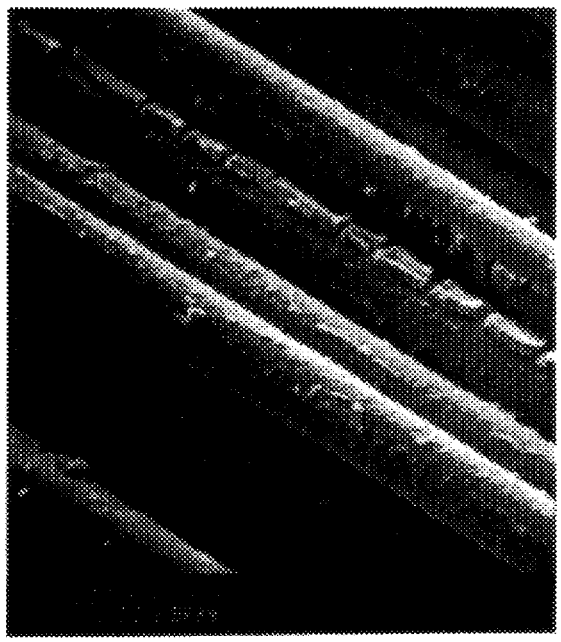
FIG. 6a is a photocopy of a photograph illustrating $Al_2O_3$ fibers coated with $TiO_2$.
Figure 6B:
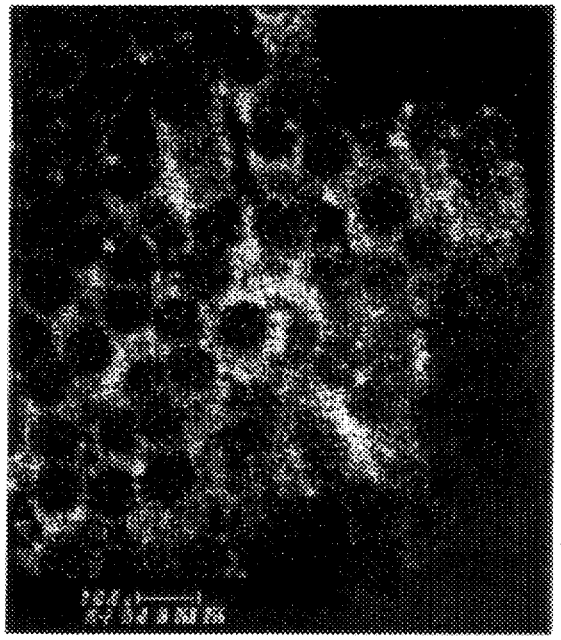
Figure 6C:
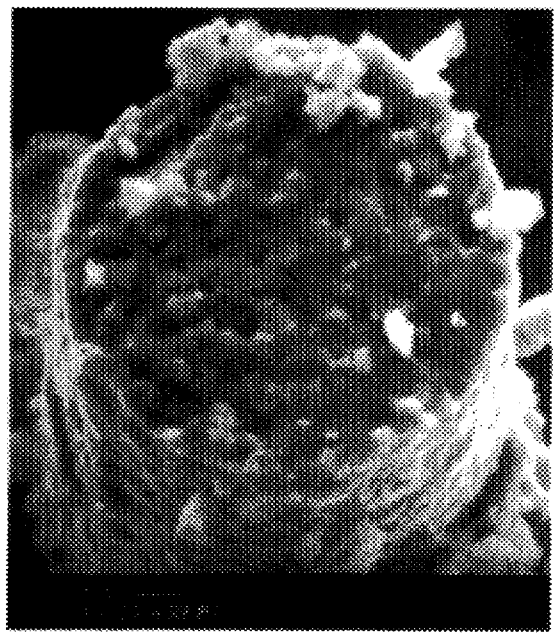
Figure 6D:
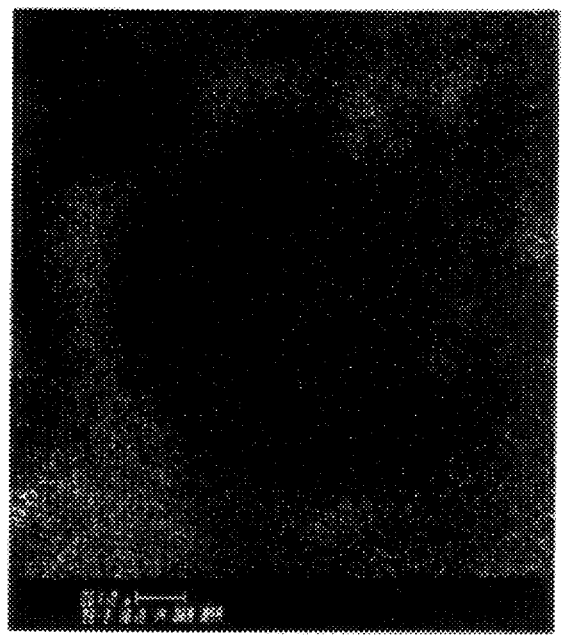
FIG. 6d is a photocopy of a photograph of an X-ray map of FIG. 6c.

A second embodiment of the present invention utilizes $TiO_2$ coatings for $Al_2O_3$ fibers instead of $SnO_2$ solution. The same procedure as described for $SnO_2$ is followed, except that $SnO_2$ is replaced by a 11% amine stabilized $TiO_2$ solution such as that sold by Nalco Chemical Co. of Naperville, Ill. FIGS. 6a, 6b and 6c show that approximately 0.1 µm thick coatings that are virtually free of bridging can be deposited by following this procedure.

Figure 7A:
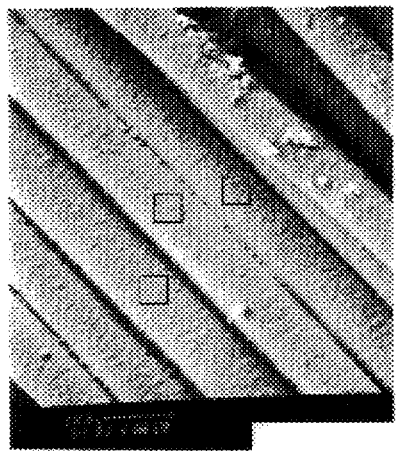
FIG. 7a is a photocopy of a photograph of $Al_2O_3$ fibers coated with $ZrO_2$.
Figure 7B:
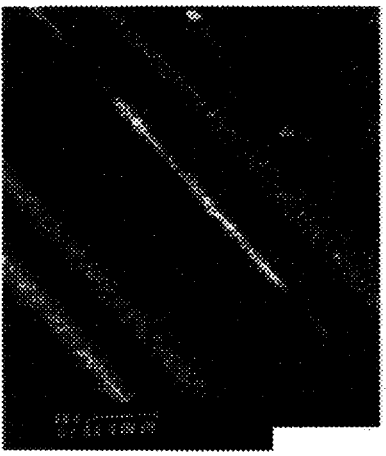
Figure 7C:
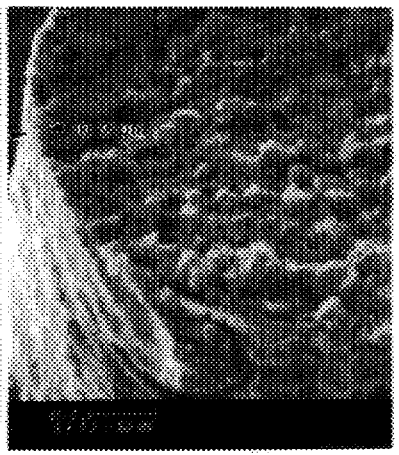

A third embodiment of the present invention utilizes $ZrO_2$ coatings in place of $SnO_2$. The same procedure as described for $SnO_2$ is followed, except that polymethyl methacrylate such as that sold under the trademark Darvan C. by R. T. Vanderbilt Co., Inc. of Norwalk, Conn. is substituted for polyethylenimine and a 20% nitrate stabilized $ZrO_2$ solution for $SnO_2$ (5–10 nm in diameter), such as that sold by Nyacol Products, Inc. of Ashland, Mass. FIGS. 7a, 7b and 7c show that high quality $ZrO_2$ coatings can be deposited by this method.

Figure 8:
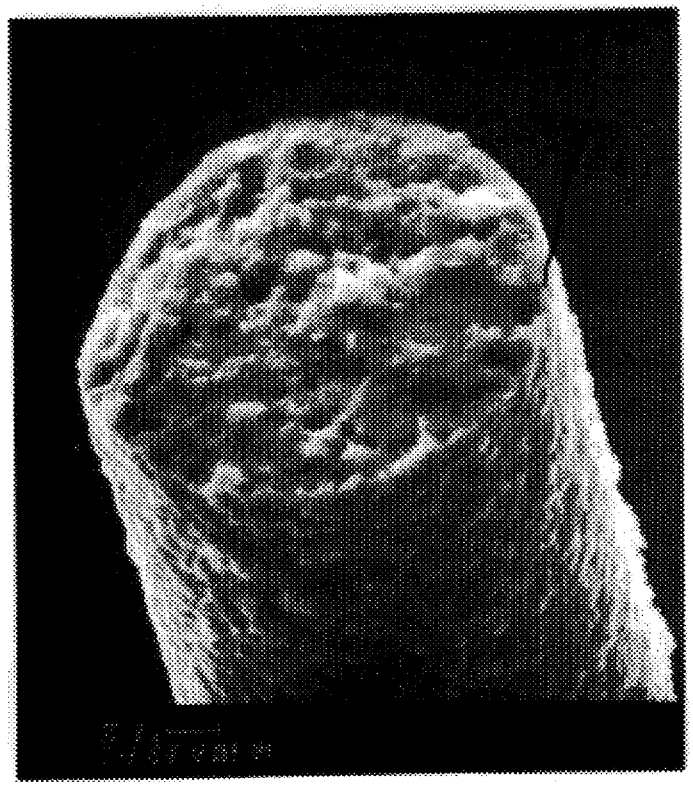
FIG. 8 is a photocopy of a photograph illustrating an $Al_2O_3$ fiber coated with YAG.

A fourth embodiment of the present invention provides for YAG coatings on $Al_2O_3$ fibers. The same procedure as described above for the $ZrO_2$ coatings is followed except for the replacement of fine $Y_3Al_5O_{12}$ (Yttrium aluminum) particles for $ZrO_2$. FIG. 8 shows the morphology of $Al_2O_3$ fibers coated with $Y_3Al_5O_{12}$ particles.

The $Y_3Al_5O_{12}$ powder is prepared by dissolving stoichiometric amounts of $Y(NO_3)_3 6H_2O$ and $Al(NO_3)_3 9H_2O$ in excess $H_2O$. After thoroughly mixing, the solution is dripped into a rapidly stirring aqueous solution of $NH_3$. Upon mixing, white gelatinous solid particles precipitate immediately. The precipitates are washed with an excess amount of demineralized water by sedimentation and decantation. The washing powder is repeated three times and dried at 110° C. The dried powder is then calcined by heating up to 800° C. at 5° C./min and holding at 800° C. for 1 hour. The calcined powder is then thoroughly ground with a mortar and a pestle. The ground powder is dispersed in water with ultrasonic vibration and stirring. The pH of the dispersion is maintained at 3 or below. The suspension is then settled to separate the fine from coarse agglomerates. Only the fine particles are collected and used for the coating process.

Figure 9A:
FIG. 9a is a photocopy of photograph illustrating $Al_2O_3$ fibers coated with $ZrO_2$ having a thickness of 0.3–0.4 μm.
Figure 9B:
Figure 9C:
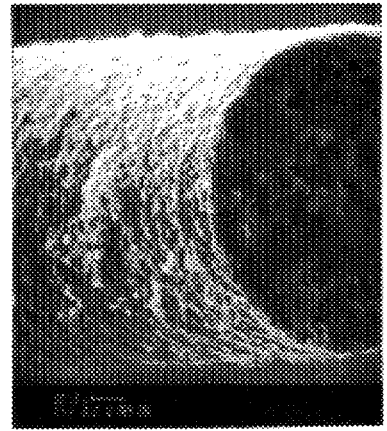

The thickness of coatings can be controlled by 1) adjusting the magnitude of the potential difference between the fiber and the coating precursor and 2) by adjusting the size of coating particles. Instead of using 5–10 nm sized particles as illustrated above for $ZrO_2$ coatings, 200 nm $ZrO_2$ particles can be used. Using the much coarser particles results in approximately 0.3–0.4 µm thick coatings instead of 0.2 as shown in FIGS. 9a, 9b and 9c.

While specific embodiments of the invention have been shown and described in detail to illustrate the application of the principles of the invention, it will be understood that the invention may be embodied otherwise without departing from such principles.

What is claimed is:

1. A method for coating ceramic fibers, the method comprising the steps of:

immersing ceramic fibers in polymethyl methacrylate having a pH ranging from 8 to 12;

allowing the polymethyl methacrylate to adsorb on the fibers;

washing the unabsorbed polymethyl methacrylate from the fibers with distilled water;

depositing the fibers in an oxide solution;

allowing the oxide solution to adsorb on the fibers;

washing the unabsorbed oxide solution from fibers with distilled water; and sintering the fibers.

2. The method according to claim 1, wherein the oxide solution comprises $SnO_2$.

3. The method according to claim 2, wherein the oxide solution comprises approximately 5% to 50% by weight $SnO_2$.

4. The method according to claim 3, wherein the distilled water has a pH ranging between 5 and 7.

5. The method according to claim 4, wherein the fibers are sintered at a temperature ranging from 400° C. to 1200° C.

6. The method according to claim 5, including the step of winding the fibers on a spool after sintering.

7. The method according to claim 1, wherein the distilled water has a pH ranging between 5 and 7.

8. The method according to claim 1, wherein the oxide solution comprises an amine stabilized $TiO_2$.

9. The method according to claim 1, wherein the oxide solution comprises a nitrate stabilized $ZrO_2$.

10. A method for coating $Al_2O_3$ fibers, the method comprising the steps of:

immersing $Al_2O_3$ fibers in a polymethyl methacrylate solution;

allowing the polymethyl methacrylate to adsorb on the fibers;

washing the unabsorbed polymethyl methacrylate from the fibers with distilled water having a pH ranging from 5 to 7;

depositing the fibers in a $Y_3Al_5O_{12}$ solution;

allowing the $Y_3Al_5O_{12}$ to adsorb on the fibers;

washing the unabsorbed $Y_3Al_5O_{12}$ from the fibers with distilled water having a pH ranging from 5 to 7; and sintering the fibers at a temperature ranging from 400° C. to 1200° C.

* * * * *